B. CROW.
TROLLEY WHEEL.
APPLICATION FILED AUG. 8, 1908.
929,918.
Patented Aug. 3, 1909.
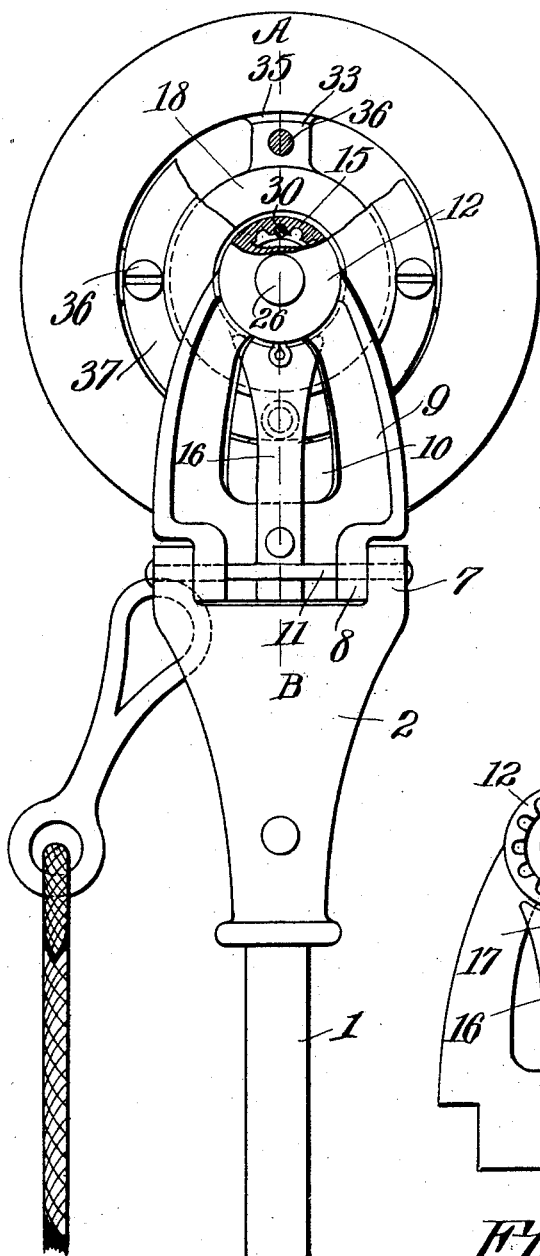
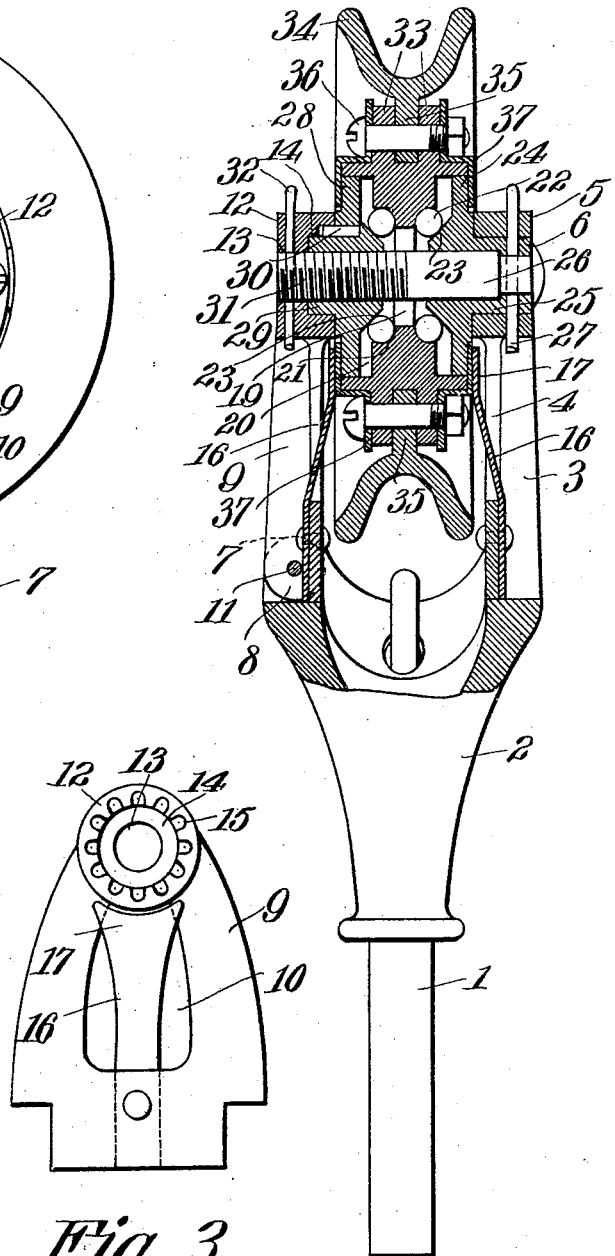
Fig. 1.   Fig. 3.   Fig. 2.
Witnesses,   Inventor,
   Bert Crow.
By C. A. Snow & Co.
   Attorneys

UNITED STATES PATENT OFFICE.

BERT CROW, OF FINDLAY, OHIO.

TROLLEY-WHEEL.

No. 929,918.          Specification of Letters Patent.          Patented Aug. 3, 1909.

Application filed August 8, 1908. Serial No. 447,622.

*To all whom it may concern:*

Be it known that I, BERT CROW, a citizen of the United States, residing at Findlay, in the county of Hancock and State of Ohio, have invented a new and useful Trolley-Wheel, of which the following is a specification.

This invention relates to trolley harps and wheels.

The principal object of the invention is to provide a trolley wheel having a detachable rim which can be removed in the event of wear or breakage and another one substituted therefor. It thus becomes possible to form the main portion of the wheel of metal such as iron or steel while the rim portion only can be formed of copper or brass, thus reducing the cost of the wheel.

A further object is to provide a sectional wheel which is so mounted that the rim thereof can be taken off and a new one secured in position without the necessity of removing the wheel from the harp.

A further object is to provide a bearing for the wheel which can be readily taken up in the event of wear, and which will keep the wheel true under all conditions, and thus prevent it from slipping on the wire, which, as is well known, causes a large proportion of the wear upon wheels now in use.

With these and other objects in view, the invention consists in certain novel details of construction and combinations of parts hereinafter more fully described and pointed out in the claims.

In the accompanying drawings the preferred form of the invention has been shown.

In said drawings:—Figure 1 is a side elevation of the trolley harp and wheel constituting the present invention, a portion of the harp and of the wheel being broken away. Fig. 2 is a section on line "A—B" Fig. 1. Fig. 3 is an inner elevation of the movable member or hasp of the trolley harp.

Referring to the figures by characters of reference, 1 designates the stem of the trolley harp, said stem extending from one end of the body 2 of said harp, there being an arm 3 integral with and extending from one side of the body, said arm being formed with an elongated opening 4 at the center thereof. An enlargement 5 is formed at the free end of the arm and has an opening 6 extending therethrough.

Ears 7 extend upwardly from the opposite side of the body 2 and projecting between these ears is one end 8 of a hasp 9, similar in outline to the arm 3, and also provided with an elongated opening 10. A pivot pin 11 extends transversely through the ears 7 and the adjoining portion 8 of the hasps 9, so that it becomes possible to swing the hasp relative to the harp body 2. An enlargement 12 is formed at the free end of the hasp, said enlargement being provided with an opening 13 arranged in the center thereof and the inner end of which is countersunk as indicated at 14. Notches or recesses 15 are formed within the wall of the countersunk portion 14. A contact strip or brush 16 is secured to the outer face of the arm 3 and another similar brush is secured to the outer face of the hasp 9. The two brushes extend through the openings 4 and 10 respectively and converge upwardly, the terminals of the brushes being preferably disposed in parallel planes as indicated at 17.

The wheel constituting the present invention consists of a cylindrical core 18 having a passage 19 extending through the center thereof, the ends of the passage being counterbored as indicated at 20. A race 21 is formed within the inner wall of each counterbore within the wheel and a series of balls 22, or other suitable anti-friction devices, is mounted within the race. Each series of balls surrounds a cone 23 and one of these cones is formed upon one face of a disk 24 designed to fit within one of the counterbores 20. A boss 25 loosely extends from the other face of the disk 24 and is fitted within the opening 6 hereinbefore referred to. An axle 26 extends through the cone 23 and boss 25, and is held against displacement by a cotter-pin 27 or other device extending diametrically through the enlargement 5, the boss 25, and the axle 26. The other cone 23 is formed upon the inner face of a disk 28, fitting loosely within the other counterbore 20 in the wheel, said disk being provided upon its outer face with a central boss 29, designed to fit within the countersink 14. A locking pin or key 30 is seated within the disk 28 and projects therebeyond close to the boss 29, and this key is designed to fit within any one of the notches 15, and thus prevent the boss 29 and the disks 28 from rotating independently of the enlargement 12. That portion of the axle 26 extending through the boss 29 and the enlargement 12 is screw-threaded as indicated at 31, but is only engaged by the threads within the boss 29. The enlargement 12 can be swung off of the end of the axle by swinging the hasp 9 upon its pivot-pin 11. To prevent this movement of the hasp however, a counter-pin or similar securing device such as indicated at 32 is extended through the enlargement 12 and also through the end of the axle 26.

Ears 33 extend radially from the core 18 of the wheel, said ears being arranged in pairs and the pairs being spaced apart at regular intervals. A wheel rim 34 formed of copper, brass, or other preferred metal, surrounds the core 18 and the ears 33 thereon; and, extending inwardly from this rim are ears 35 designed to fit between the ears of each pair radiating from the core 18. The ears 33 and 35 are designed to be secured together by bolts 36 which extend transversely therethrough. These bolts also serve to retain in position the cap 37 of copper or other suitable conducting material, said cap being so shaped as to extend across the outer faces of the disks 24 and 28 and to lap, and bear snugly upon the outer faces of the ears 33.

It will be apparent that when the wheel herein described rotates within the harp the cap 37 will revolve therewith and between the ends 17 of brushes 16. Inasmuch as these brushes bear at all times upon the cap, it will be seen that they coöperate therewith to conduct the current from the rim 34 to the body 2 of the harp. Should the rim 34 become worn or broken it can be readily removed from the wheel. This is done by first withdrawing the pin 32 from engagement with the enlargement 12 of hasp 9. The hasp is then swung outwardly upon its pivot 11 and off of the end of the axle 26. Bolts 36 are then disengaged from ears 33 and 35, after which the rim 34 is partly revolved relative to the core 18, so as to bring the ears 35 out of position between the ears 33. Rim 34 can then be removed laterally from the core of the wheel, and, by reversing the foregoing operation, a new rim can be secured in position. When it is desired to take up wear within the bearings of the wheel the hasp is disengaged from the axle 26 by withdrawing pin 32 and swinging the hasp 9 laterally. The boss 29 and disk 28 are then rotated upon the threaded portion of the axle 26, and will cause the cone 23 carried thereby to move inwardly against the series of balls 22 contacting therewith. The bearing will thus be tightened and after the parts have been returned to their normal positions, the key 30 carried by disk 28 will project into one of the notches 15 and be held so as to prevent rotation of the disk 28. It is of course to be understood that the other cone 23 is held against rotation at all times by the pin 27. By providing two series of anti-friction devices 22, the wheel is held true at all times.

It is to be understood of course that the rim 34 can be made of copper, brass, or other suitable conducting material, whereas the core of the wheel can be made of steel or other material different from that constituting the rim. Inasmuch as the rim can be changed whenever worn, it will be seen that the life of the wheel is considerably prolonged.

Various changes in the size and proportions of the parts can of course be made without departing from the spirit or sacrificing the advantages of the invention.

What is claimed is:—

1. A trolley wheel comprising a core, laterally spaced radial ears thereon, a rim, inwardly extending ears integral therewith and movable annularly between the ears on the core, caps bearing upon opposite faces of the core and lapping the ears, and means extending through the caps and ears for detachably securing them together.

2. The combination with a trolley harp; of a wheel journaled therein and comprising a core, radial, laterally spaced ears upon the core, a rim, inwardly extending ears integral with the rim and shiftable into position between the laterally spaced ears of the core, caps snugly fitted upon the sides of the core and lapping the ears, means extending through the caps and ears for detachably securing them together, and brushes carried by the harp and bearing against the caps.

3. The combination with a trolley harp, comprising a body, an arm rigid therewith, and a hasp pivotally connected to the body; of a trolley wheel comprising a core mounted within the arm and detachably engaged by the hasp, a rim detachably secured upon the core, caps detachably secured to the sides of the core, and brushes secured to the arm and hasp respectively and bearing upon the adjacent caps.

4. The combination with a trolley harp comprising a body, an arm rigid therewith, and a hasp pivotally connected to the body; of a wheel supported by the arm and hasp, said hasp being mounted to swing into or out of engagement with the wheel, and an adjustable bearing within the wheel, said hasp having means for locking the bearing against adjustment.

5. The combination with a trolley harp comprising a body, an arm extending therefrom, and a hasp mounted to swing relative to the body; of a wheel supported by the arm and hasp and comprising a core, cones adjustable into opposite portions thereof, anti-friction devices within the core and bearing upon the cones, and a fixed axle extending through the cones, one of said cones being adjustable upon the said axle, said hasp having means coöperating with the cone for locking said cone against adjustment.

6. The combination with a trolley harp comprising a body, an arm extending therefrom, and a hasp movable relative to the body; of a wheel supported by the arm and hasp, said wheel comprising a core, a fixed axle extending through the core, a relatively fixed cone upon the axle and projecting into the core, an adjustable cone upon the axle and projecting into the opposite face of the core, anti-friction devices within the core and bearing upon the cones, said hasp having means for securing the cone against adjustment, and means extending through the axle and engaging the arm and the hasp respectively for holding said axle against movement relative to the arm and hasp.

In testimony that I claim the foregoing as my own, I have hereto affixed my signature in the presence of two witnesses.

BERT CROW.

Witnesses:
 MARION G. FOSTER,
 T. D. BARNETT.